F. C. SCHMID.
MEASURING INSTRUMENT.
APPLICATION FILED NOV. 13, 1912.
1,089,969.
Patented Mar. 10, 1914.
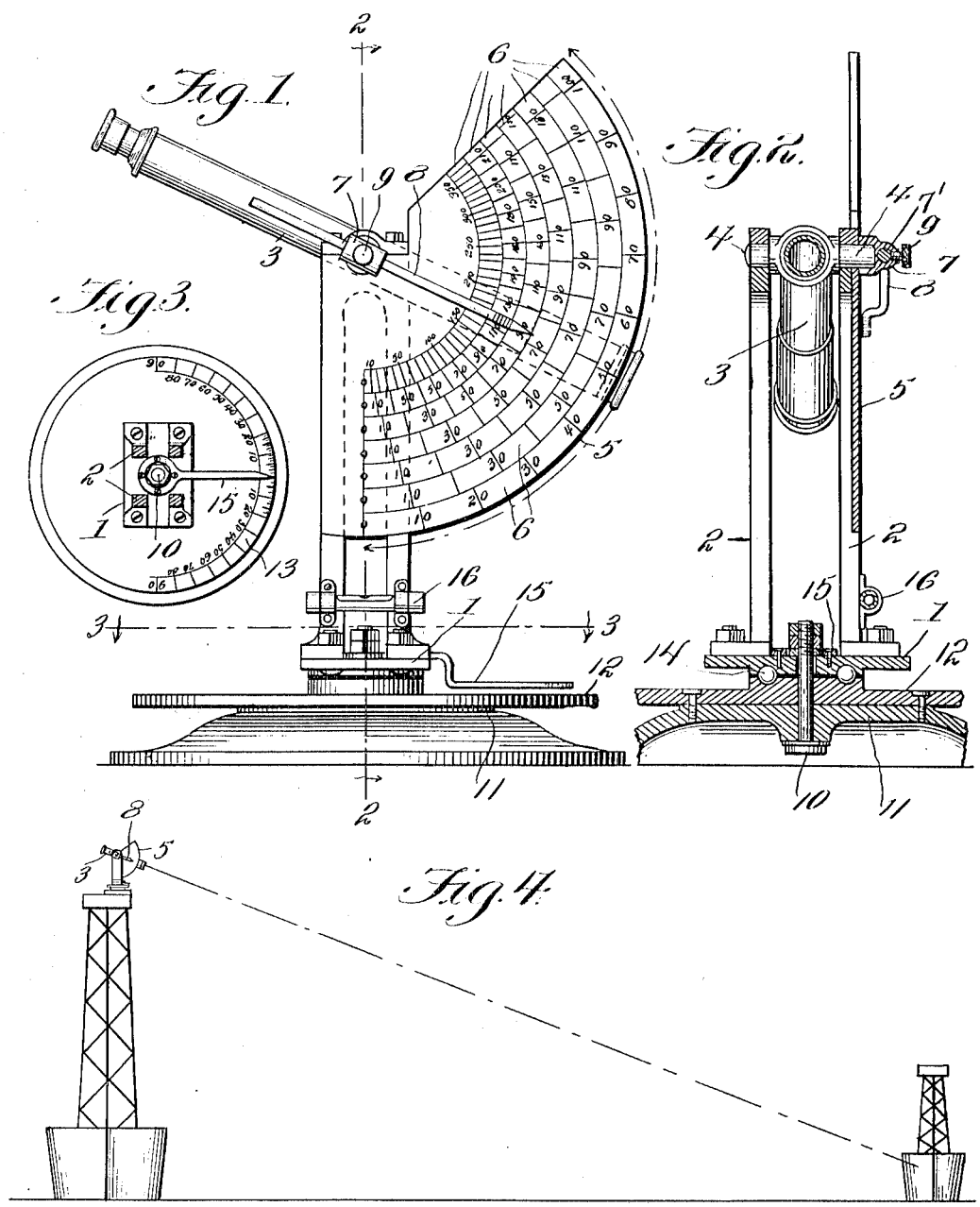
Witnesses
Inventor
Francis C. Schmid
By Victor J. Evans,
Attorney

UNITED STATES PATENT OFFICE.

FRANCIS C. SCHMID, OF WASHINGTON, DISTRICT OF COLUMBIA.

MEASURING INSTRUMENT.

1,089,969.   Specification of Letters Patent.   Patented Mar. 10, 1914.

Application filed November 13, 1912. Serial No. 731,138.

*To all whom it may concern:*

Be it known that I, FRANCIS C. SCHMID, a citizen of the United States, residing at Washington, in the District of Columbia, have invented new and useful Improvements in Measuring Instruments, of which the following is a specification.

This invention relates to measuring instruments of that type which are generally known as range finders and which are used for accurately ascertaining distances upon flat surfaces and more particularly upon water.

One object of the invention is to provide an instrument of simple construction which may be easily manipulated and which shall be provided with a plurality of scales which may be employed at various predetermined elevations to ascertain the distance of a given object.

A further object of the invention is to combine with an instrument of the class described a protractor and a pointer coöperating therewith for the purpose of indicating the lateral deflection from a given line of the object the distance of which is to be ascertained.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a side elevation of a range finder constructed in accordance with the invention. Fig. 2 is a vertical sectional view taken on the line 2—2 in Fig. 1. Fig. 3 is a horizontal sectional view on a smaller scale taken on the line 3—3 in Fig. 1. Fig. 4 is a diagram illustrating the use of the invention.

Corresponding parts in the several figures are denoted by like characters of reference.

The instrument, in the form shown in the drawing, includes a flat plate 1 on which uprights 2, 2 are mounted, said uprights serving to support between them a telescope 3 which is pivotally mounted by means of trunnions 4 so as to be capable of swinging freely between the uprights. Secured on one of the uprights is a sector 5 having a plurality of concentric scales 6 which have been previously calculated, as will be presently set forth. Fixed upon one of the trunnions so as to rotate therewith is a sleeve 7, the axis of the bore 7' of which is preferably parallel to the axis of the telescope. Said sleeve accommodates an adjustable pointer 8 which may be retained in adjusted position by means of a set screw 9 so as to coöperate with any one of the scales 6.

The foot plate 1 is mounted by means of an ordinary pivot member 10 on a base 11 upon which a disk 12 having a protractor 13 inscribed thereon is mounted, as shown, it being, of course, understood that the disk 12 may be integral with the base. Antifriction members, such as balls 14, may be interposed between the foot plate and the base, if desired. Fixedly associated with the foot plate is a pointer 15 coöperating with the protractor 13. A spirit level 16 may be mounted on one of the uprights 2 or in any convenient position upon the instrument for the purpose of ascertaining when the instrument is level.

It is evident that when at any predetermined height the telescope is focused upon a distant object, the axial line of the telescope will always lie at the same angle to the base when the object is at a predetermined distance from the instrument. Bearing this in mind, the various scales 6 are previously calculated according to various elevations at which the instrument may be employed, say 10, 15, 20 yards of elevation, and so on, with intervals of five yards. It is obvious then that when the instrument is used on shipboard and is carried to a certain known elevation at which the object, the range of which is desired, may be best seen, the pointer 8 may be readily and quickly adjusted to read on the scale 6 corresponding with the height at which the instrument is located. The instrument having been placed at the desired elevation, it is adjusted squarely athwart the vessel, the pivotal axis of the trunnions on which the telescope swings being parallel to the length of the ship. When the instrument is in a level position, as shown by the spirit level, the distance of any given object upon which the telescope is focused will then be correctly indicated on the scale with which the pointer coöperates. It is further obvious that when, in order to focus the telescope, the instrument must be turned about the axis of the vertical pivot 10, the lateral deflection will be indicated by the pointer 15 on the protractor 13. It is obvious that the telescope is to be provided with the customary cross wire for the purpose of giving the observer the true point of view.

While in the drawing the range scales 6 have been shown as extending to a line normally coinciding with the vertical axis of the instrument, this is obviously not necessary except to provide a zero or starting point for the scales. It will, however, be observed that the range scales are shown as extending considerably beyond 90°, or beyond the infinity mark, whereby provision is made for measuring the amplitude of oscillation or rolling of the ship in order that the target or objective point may be kept in the focus of the telescope and proper allowance may be made in determining the range according to the degree of oscillation. In gaging the degree of oscillation the observer looking through the telescope keeps the telescope trained on the object while he or his assistant notes the angles indicated at the extreme limits of travel of the pointer over the scale, the intermediate or mean point or angle indicating the range. The amplitude of oscillation of the vessel may also be ascertained in a similar manner by noticing on the range scale the angles indicated by the pointer with relation to the horizon, as indicated by the spirit level 16. With this understanding of the operation of the instrument it is evident also that the instrument may be used for ascertaining altitudes when desired. By means of the protractor the speed of a vessel at a distance ahead and traveling at right angles to the line of travel of the vessel on which the instrument is mounted may also be approximately calculated, by training the telescope on the objective vessel and keeping it trained thereon until such objective vessel crosses the line of travel of the observing vessel, the angle and distance of travel of the objective vessel being indicated by the pointer 15 on the protractor 13. The observing vessel being at rest, or its speed known, and the time of travel of the objective vessel between the primary and final angles on the protractor being noted, it is evident that the speed of travel of the objective vessel may be easily and conveniently calculated.

Having thus described the invention, what is claimed as new, is:—

1. In an instrument of the class described, an upright mounted for rotary movement about a vertical axis, a telescope supported for swinging movement on said upright about a horizontal axis, a sleeve fixedly associated with the telescope, a sector associated with the upright, said sector having a plurality of concentric graduated scales exceeding 90° in extent, and a pointer adjustably mounted in the sleeve for coöperation with any one of said scales.

2. In an instrument of the class described, an upright, a sector carried thereby and having a plurality of concentric graduated scales exceeding 90° in extent, a telescope pivotally supported on the upright, and a pointer adjustably connected with the telescope for coöperation with any one of the graduated scales.

3. In an instrument of the class described, a base having a horizontal disk provided with a protractor, an upright pivotally mounted on the disk and having a pointer coöperating with the protractor, a sector secured on the upright, said sector having a plurality of concentric graduated scales, a pivotally supported telescope on said upright, a sleeve associated with the telescope, a pointer adjustable in the sleeve to coöperate with any one of the scales on the sector, and a spirit level supported on the upright.

In testimony whereof I affix my signature in presence of two witnesses.

FRANCIS C. SCHMID.

Witnesses:
  WM. BERGGER,
  E. EDMONSTON, Jr.